US 9,426,382 B2

(12) United States Patent
Matsuoka

(10) Patent No.: US 9,426,382 B2
(45) Date of Patent: Aug. 23, 2016

(54) IMAGE PROCESSING APPARATUS AND METHOD IN WHICH FIRST AND SECOND IMAGES ARE COMBINED IN A WEIGHTED MANNER BASED ON A THIRD IMAGE

(75) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/358,696

(22) Filed: Jan. 26, 2012

(65) Prior Publication Data
US 2012/0200744 A1 Aug. 9, 2012

(30) Foreign Application Priority Data

Feb. 7, 2011 (JP) ................................ 2011-024435

(51) Int. Cl.
*H04N 5/232* (2006.01)
*H04N 5/235* (2006.01)
*G06T 5/00* (2006.01)

(52) U.S. Cl.
CPC ........... *H04N 5/2356* (2013.01); *H04N 5/2327* (2013.01); *H04N 5/2355* (2013.01); *H04N 5/23254* (2013.01); *H04N 5/23258* (2013.01); *G06T 5/007* (2013.01); *G06T 2207/20208* (2013.01)

(58) Field of Classification Search
USPC ............... 348/239, 362–366, 229.1; 382/205
See application file for complete search history.

(56) References Cited

U.S. PATENT DOCUMENTS

| | | | | |
|---|---|---|---|---|
| 5,818,964 A * | 10/1998 | Itoh | ............................... | 382/205 |
| 6,879,721 B2 * | 4/2005 | Bradburn | ....................... | 382/205 |
| 2004/0136603 A1 | 7/2004 | Vitsnudel et al. | | |
| 2005/0013486 A1 * | 1/2005 | Wiedemann | ......... | G06K 9/6857 |
| | | | | 382/181 |
| 2006/0045377 A1 * | 3/2006 | Kawai | ........................... | 382/274 |
| 2008/0219585 A1 * | 9/2008 | Kasai et al. | .................... | 382/274 |
| 2008/0267530 A1 * | 10/2008 | Lim | ................................ | 382/284 |
| 2010/0231731 A1 * | 9/2010 | Motomura | ......... | H04N 5/23248 |
| | | | | 348/208.4 |
| 2011/0058050 A1 * | 3/2011 | Lasang et al. | .............. | 348/208.4 |
| 2011/0222793 A1 | 9/2011 | Ueda et al. | | |

FOREIGN PATENT DOCUMENTS

| | | | | |
|---|---|---|---|---|
| EP | 2299697 A2 | 3/2011 | | |
| JP | 2003158669 A | * 5/2003 | ............ | H04N 5/235 |
| JP | 2005-223769 | 8/2005 | | |
| JP | 2009-010566 | 1/2009 | | |

OTHER PUBLICATIONS

The above references were cited in a British Search/Examination Report issued on Jun. 7, 2012, which is enclosed, that issued in the corresponding British Application No. GB1202012.9.

* cited by examiner

*Primary Examiner* — Roberto Velez
*Assistant Examiner* — Quan Pham
(74) *Attorney, Agent, or Firm* — Cowen, Liebowitz & Latman, P.C.

(57) ABSTRACT

A first image captured using a first exposure and a second image captured using a second exposure higher than the first exposure are obtained. A third image used as a reference for combining processing is created from the first image. An image, a dynamic range of which is extended, is created by weighted-combining the first and second images using adding coefficients, which are associated with pixel values of the third image in advance.

6 Claims, 8 Drawing Sheets

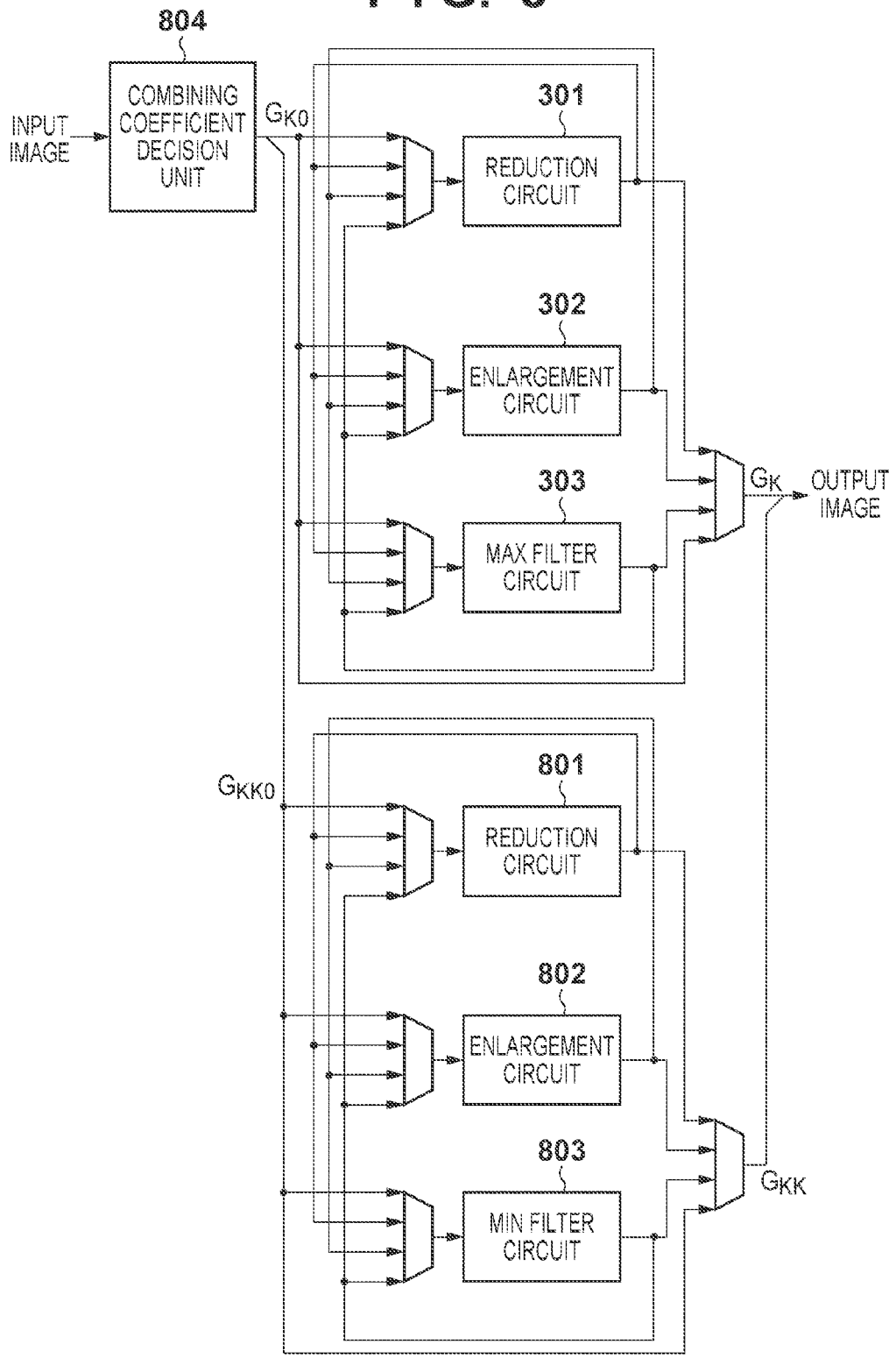

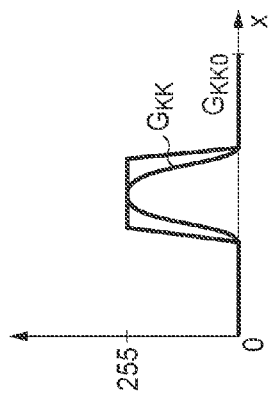
FIG. 9B
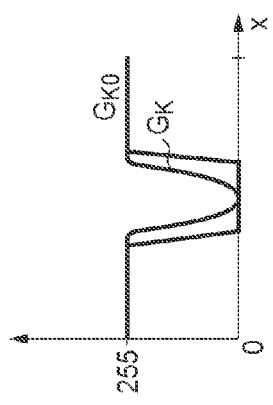
FIG. 9A
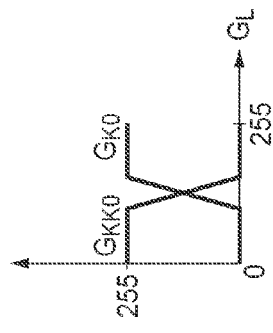
FIG. 9G
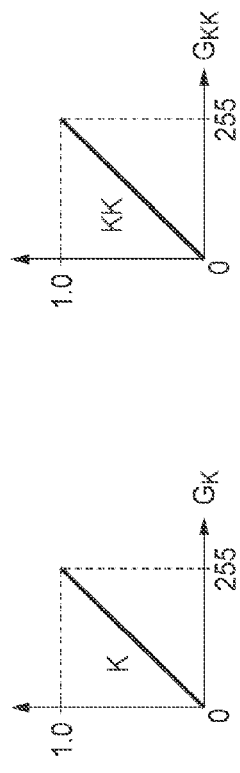
FIG. 9D
FIG. 9C
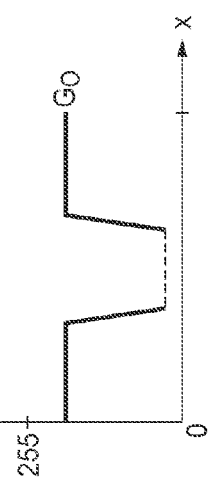
FIG. 9F
FIG. 9E F I G. 10
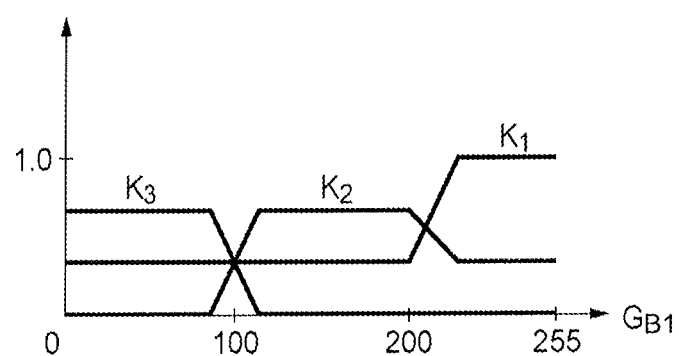

IMAGE PROCESSING APPARATUS AND METHOD IN WHICH FIRST AND SECOND IMAGES ARE COMBINED IN A WEIGHTED MANNER BASED ON A THIRD IMAGE

BACKGROUND OF THE INVENTION

1. Field of the Invention

The present invention relates to a technique for generating an image, a dynamic range of which is extended.

2. Description of the Related Art

In recent years, a so-called HDR (High Dynamic Range) technique for generating an image, a dynamic range of which is extended compared to an image obtained by normal imaging in an imaging apparatus such as a digital camera, is known. More specifically, an image processing method using the HDR technique can create an image (HDR image), a dynamic range of which is extended by combining a plurality of images captured to have different exposures.

However, in the HDR image created in this way, since a plurality of images are combined, multiple edges may appear at an edge portion of the obtained image due to the influences of image blurs and shakes acting on the imaging apparatus. Such multiple edge phenomenon in the created HDR image is notably confirmed especially at a boundary portion between high- and low-lightness portions.

The multiple edge phenomenon in the HDR image will be described in detail below using the drawings. Note that an example of creating an HDR image by combining two images having different exposures will be explained for the sake of simplicity.

For example, a framing in which a person as a main subject stands in a backlight relationship with respect to a background image with a high luminance value, as shown in FIG. 4A, will be examined below. In an image captured at that time, since a region where the main subject is rendered is a low-luminance region, when the main subject has moved or when the imaging apparatus has been shaken, multiple edges appear at a boundary portion between the main subject and background in an HDR image.

At this time, when a horizontal line 401 of the image shown in FIG. 4A is selected as a line of interest, in a low-exposure captured image and a high-exposure captured image, which are to be combined, pixel values $D_L$ and $D_H$ at x-coordinates of that horizontal line show behaviors shown in FIG. 5A. In FIG. 5A, the pixel values of the two images have different coordinates where the pixel values lower, due to the motion of the main subject or shakes of the imaging apparatus. Note that the exposure of the high-exposure captured image is four times that of the low-exposure captured image, and the pixel value of the high-exposure captured image is saturated in a high-luminance background region in the example shown in FIGS. 5A to 5F.

In order to combine two images having different exposures, the two images undergo gamma conversion or transformation. Since these images have different exposure conditions, the gamma conversion is done using different conversion characteristic curves for the respective images, as shown in FIG. 5B. In this manner, gamma conversion outputs $G_L$ and $G_H$, which are converted in this way, show behaviors shown in FIG. 5C.

As can be seen from the gamma conversion outputs of the two images having different exposures, the high-exposure captured image whose background region is saturated exhibits gamma conversion output that is different from that of the low-exposure captured image in the background region. Also, in the low-exposure captured image, shadow saturation tends to occur in a low-luminance region generally, and a subject is not sharply expressed in that region. That is, an HDR image to be created preferably uses a low-exposure captured image for a high-luminance region, and a high-exposure captured image for a low-luminance region.

For this purpose, as an image having a reference exposure required to create an HDR image, a low-exposure captured image free from any saturated region is selected, and an adding coefficient K shown in FIG. 5D is decided according to a gamma conversion output $G_L$ of that image. The adding coefficient K is that which is decided in advance to decide a combining method of a low-exposure captured image and high-exposure captured image in an HDR image to be created, and a gamma output $G_O$ of the HDR image can be expressed by:

$$G_O = K \times G_L + KK \times G_H \quad (1)$$

The adding coefficient K changes from 0 to 1 within a predetermined gamma conversion output range, as shown in, for example, FIG. 5D. Also, an adding coefficient KK is given by (1−K). More specifically, the two images, that is, the low-exposure captured image and high-exposure captured image are combined within a range of 0<K<1, only the low-exposure captured image is used in creation within a range of K=1, and only the high-exposure captured image is used in creation within a range of K=0.

The gamma conversion output of the HDR image created in this way shows a behavior shown in FIG. 5E. As can be seen from FIG. 5E, when the images having the different exposures, which are used to create the HDR image, suffer any image blurs or shakes of the imaging apparatus at their capturing timings, an image of a high-luminance region of the high-exposure captured image is combined in a low-luminance region. In this case, the multiple edge phenomenon called a pseudo edge occurs at a boundary between low- and high-luminance regions in the created HDR image.

As described above, when images to be combined suffer any image blurs or shakes of the imaging apparatus at their capturing timings, multiple edges often appear at a boundary between low- and high-luminance regions, resulting in an image quality drop of the HDR image and an unnatural feeling of the user.

Japanese Patent Laid-Open No. 2009-010566 discloses a technique for eliminating multiple edges in a combined image such that density values are averaged in the vicinity of a boundary of different intensities by setting one of a plurality of images having different exposures as an image having a reference exposure, and applying an averaging filter to the selected image.

Also, Japanese Patent Laid-Open No. 2005-223769 discloses a technique for detecting a difference between gamma conversion outputs of two images to be combined having different exposures in a given region, and creating an image by selecting a low-exposure captured image when the difference is larger than a threshold or a high-exposure captured image when the difference is smaller than another threshold.

However, with the technique of Japanese Patent Laid-Open No. 2009-010566 above, since the averaging processing is applied to the vicinity of a boundary of different intensities, the following unnatural combining processing may be unwantedly done while combining processing of images in the vicinity of the boundary. That is, since the averaging processing is applied to the vicinity of the boundary, a highlight-saturated high-exposure captured image is combined in a high-luminance region, or a shadow-saturated low-exposure captured image is combined in a low-luminance region. For this reason, since a white region is combined in the high-luminance region and a black region is combined in the low-luminance region to sandwich the boundary, an unnatural HDR image is likely to be created.

With the technique of Japanese Patent Laid-Open No. 2005-223769, fine pseudo edges are generated in a region with a small difference value of the gamma conversion outputs in a region which exhibits a steep luminance gradient.

SUMMARY OF THE INVENTION

The present invention has been made in consideration of the aforementioned problems of the related arts. The present invention provides a naturally combined image, a dynamic range of which is extended, even when image blurs or shakes of an imaging apparatus have been generated.

The present invention in its first aspect provides an image processing apparatus comprising: an obtaining unit configured to obtain a first image captured using a first exposure and a second image captured using a second exposure different from the first exposure; a creating unit configured to create a third image as a reference for combining processing from the first image; and a combining unit configured to perform weighted combination of respective pixels of the first image and the second image using adding coefficients, which are associated with pixel values of the third image, wherein creating the third image includes setting, to a maximum pixel value of pixels within a pre-set range of each pixel of the first image as the center, a pixel value of the pixel selected as the center.

Further features of the present invention will become apparent from the following description of exemplary embodiments (with reference to the attached drawings).

BRIEF DESCRIPTION OF THE DRAWINGS

FIG. 8 is a circuit diagram showing the circuit arrangement of a reference intensity creation unit according to the third embodiment of the present invention;

FIGS. 9A, 9B, 9C, 9D, 9E, 9F, and 9G are graphs for explaining processing in a signal processor according to the third embodiment of the present invention; and FIG. 10 is another graph for explaining processing in the signal processor according to the third embodiment of the present invention.

DESCRIPTION OF THE EMBODIMENTS

First Embodiment

Preferred embodiments of the present invention will be described in detail hereinafter with reference to the drawings. Note that embodiments to be described hereinafter will explain an example in which the present invention is applied to a digital camera as an example of an image processing apparatus, which can create one image, a dynamic range of which is extended using a plurality of images having different exposures. However, the present invention is applicable to an arbitrary device which can create one image, a dynamic range of which is extended using a plurality of images having different exposures.

Figure 1:
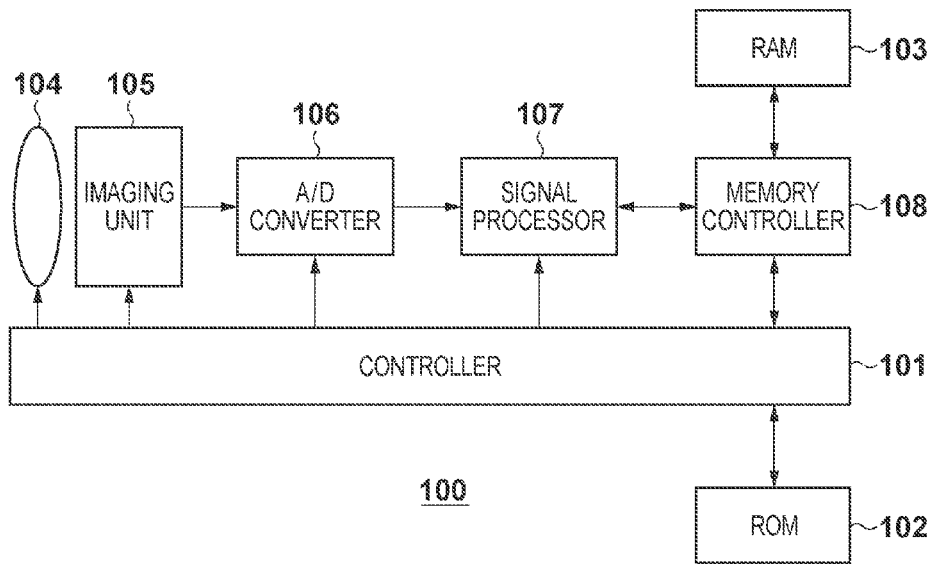
FIG. 1 is a block diagram showing the functional arrangement of a digital camera according to an embodiment of the present invention.

FIG. 1 is a block diagram showing the functional arrangement of a digital camera 100 according to an embodiment of the present invention.

A controller 101 is, for example, a microcomputer, and controls operations of respective blocks included in the digital camera 100. The controller 101 controls the operations of the respective blocks by reading out operation programs of the respective blocks included in the digital camera 100, which programs are stored in, for example, a ROM 102, and expanding and executing them in a RAM 103. The ROM 102 is, for example, an electrically rewritable non-volatile memory such as an EEPROM, and stores information such as setting values required for the operations of the respective blocks in addition to the operation programs of the respective blocks included in the digital camera 100.

The RAM 103 is a volatile memory, and is used not only as an expansion area of the operation programs of the respective blocks included in the digital camera 100 but also as an area for temporarily storing intermediate data and the like, which are output during the operations of the respective blocks. A memory controller 108 is a block which controls data read and write accesses to the RAM 103, and operates under the control of the controller 101.

Note that this embodiment will give the following description under the assumption that the operations of the respective blocks included in the digital camera 100 are controlled by the operation programs of the blocks. However, the present invention is not limited to this, and the respective blocks may be configured by circuits which execute the same processes as the corresponding operation programs.

An imaging unit 105 is, for example, an image sensing element such as a CCD or CMOS sensor. The imaging unit 105 photoelectrically converts an optical image formed on the image sensing element via an optical system 104, and outputs an obtained analog image signal to an A/D converter 106. The A/D converter 106 applies A/D conversion processing to the input analog image signal, thus outputting a digital image signal.

In this embodiment, the imaging unit 105 captures two types of images having different exposures by setting different exposure times, and two images obtained after the A/D conversion processing of the A/D converter 106 are stored in the RAM 103. Note that an image obtained based on a short exposure time will be referred to as a "low-exposure image", and an image obtained based on a long exposure time will be referred to as a "high-exposure image" hereinafter.

A signal processor 107 is a block which applies various kinds of image processing to a captured image. In this example it is assumed that the signal processor 107 can execute, for example, processing for detecting and correcting a positional deviation of a subject between the low- and high-exposure images, and the like in addition to combining processing for creating an HDR image, a dynamic range of which is extended.

(HDR Image Creation Processing)

Figure 2:
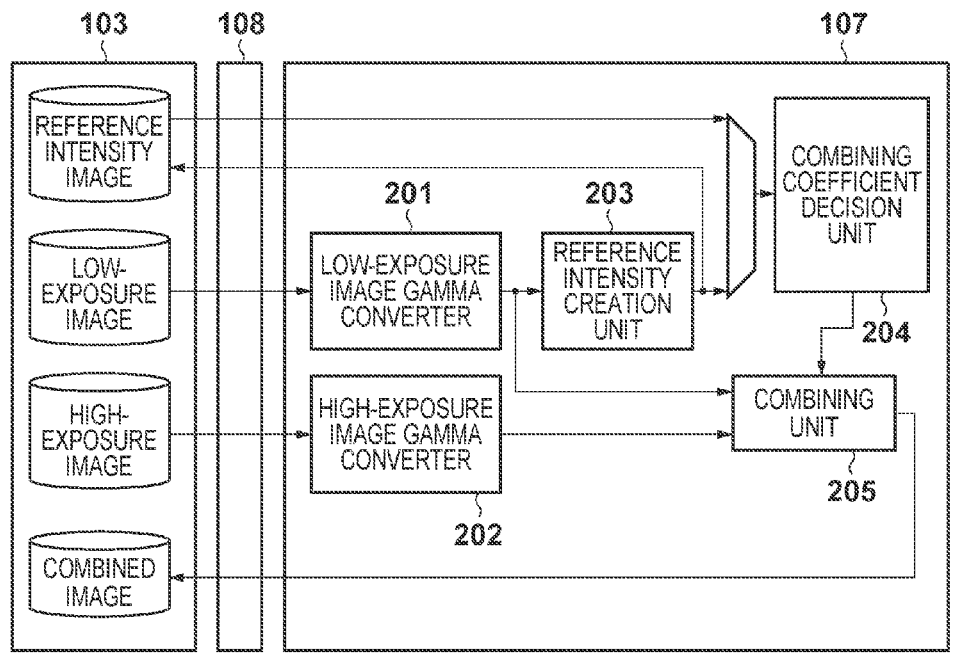
FIG. 2 is a block diagram for explaining processing required to create an HDR image according to the embodiment of the present invention.

Practical HDR image creation processing of the digital camera 100 of this embodiment with the aforementioned arrangement will be described below with reference to FIG. 2. FIG. 2 is a block diagram showing the processing to be executed by the signal processor 107, so as to explain the creation sequence of an HDR image from a low-exposure image and high-exposure image stored in the RAM 103.

A low-exposure image and high-exposure image read out from the RAM 103 by the memory controller 108 are input to the signal processor 107. The low-exposure image and high-exposure image input to the signal processor 107 undergo gamma conversion processes respectively in a low-exposure gamma converter 201 and high-exposure gamma converter 202. Note that this embodiment will explain creation of an HDR image in an imaging scene shown in FIG. 4A as in the aforementioned description of an HDR image. Also, assume that the conversion characteristics of the gamma conversion process applied by the high-exposure gamma converter 202 upon creation of the HDR image use conversion characteristic curves shown in FIG. 5B as in the above description.

The low-exposure image which has undergone the gamma conversion process is output from the low-exposure gamma converter 201 to a reference intensity creation unit 203, which creates a reference intensity image. The reference intensity image is an image used as a reference required to decide how to combine the low- and high-exposure images to create an HDR image, and the aforementioned adding coefficient K is decided using an intensity of the reference intensity image. Note that this embodiment will give the following description under the assumption that the low-exposure image is used as an image having a reference exposure. However, the present invention is not limited to this, and the high-exposure image could be used in other embodiments.

The creation method of the reference intensity image in this embodiment will be further explained using the drawings. In this embodiment, in order to avoid appearance of multiple edges in an HDR image, the contribution of an edge in the high-exposure image is controlled to be reduced in a low-luminance region in the combined HDR image. More specifically, the intensity of the reference intensity image output from the reference intensity creation unit 203 is set to be high in the low-luminance region. That is, a high adding coefficient of the low-exposure image is set in order to reduce an adding coefficient of an edge of the high-exposure image, which may suffer image blurs or shakes of an imaging apparatus and may be combined in the low-luminance region in the vicinity of a boundary between low- and high-luminance regions.

In this way, the reference intensity creation unit 203 modifies information of an intensity of the low-exposure image obtained by the gamma conversion, so as to set an adding coefficient of an edge of the high-exposure image as a low intensity in the low-luminance region in the HDR image to be created. The reference intensity image creation processing executed by the reference intensity creation unit 203 according to this embodiment will be described in detail below with reference to FIG. 3.

Figure 3:
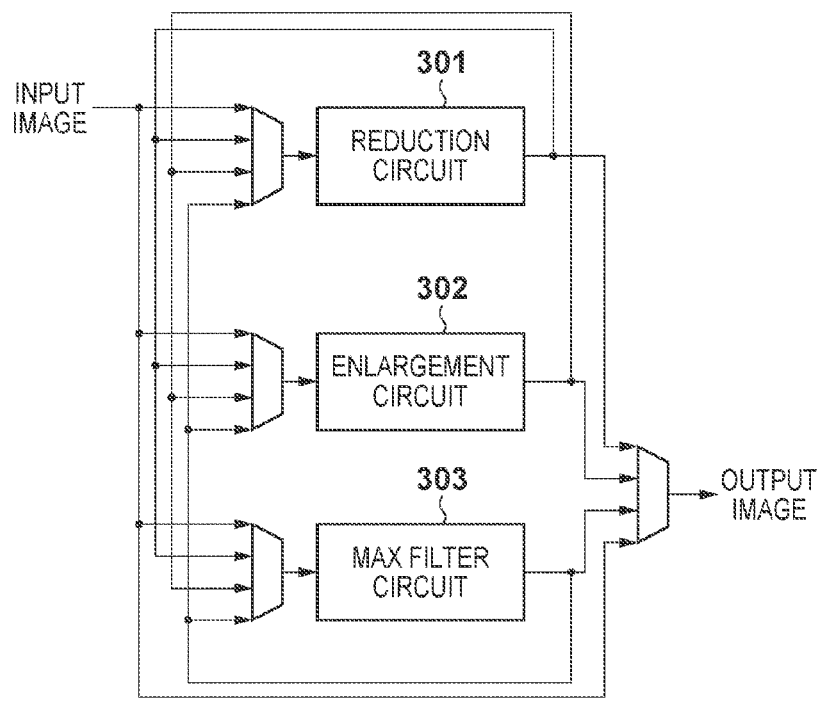
FIG. 3 is a circuit diagram showing the circuit arrangement of a reference intensity creation unit according to the first and second embodiments of the present invention.

FIG. 3 is a circuit diagram showing the processing to be executed inside the reference intensity creation unit 203. The reference intensity creation unit 203 includes a reduction circuit 301 which executes reduction processing of an image, an enlargement circuit 302 which executes enlargement processing of an image, and a MAX filter circuit 303.

The reduction circuit 301 executes the reduction processing of an input image after pre-set low-pass filter processing is applied so as not to cause any aliasing by the reduction processing.

The MAX filter circuit 303 is a conversion filter which searches 3×3 surrounding pixels of each pixel of an input image to have that pixel as the center, and substitutes a pixel value of a maximum lightness of the surrounding pixels as a new pixel value of that pixel. That is, in an image output from the MAX filter circuit 303, a high-lightness region is simply extended by one pixel in upper, lower, right, and left directions and, conversely, a low-lightness region is reduced by one pixel in upper, lower, right, and left directions, compared to the input image.

In this embodiment, in order to reduce a calculation volume associated with creation of the reference intensity image, the conversion processing in the MAX filter circuit 303 is applied to an image obtained by applying the reduction or enlargement processing to an image input to the reference intensity creation unit 203. For example, a case will be examined below wherein the conversion processing in the MAX filter circuit 303 is applied to an image obtained by applying the reduction processing for reducing the number of pixels to ½ respectively in the vertical and horizontal directions twice in the reduction circuit 301, that is, an image, the number of pixels of which is 1/16 of the input image. At this time, in an image output from the MAX filter circuit 303, that is, in an image, the number of pixels of which is 1/16 of an image input to the reference intensity creation unit 203, a high-lightness region is extended by one pixel in the upper, lower, right, and left directions. Then, when the enlargement circuit 302 applies, to the output image, enlargement processing for doubling the number of pixels respectively in the vertical and horizontal directions twice, an image having the same number of pixels as that input to the reference intensity creation unit 203 can be obtained, and the reference intensity creation unit 203 outputs that image. That is, a high-lightness region in the image output from the reference intensity creation unit 203 is extended by four pixels in the upper, lower, right, and left directions compared to the image input to the reference intensity creation unit 203.

Since the image having the reference exposure is obtained by such conversion, even when images used to create an HDR image have a deviation due to image blurs or shakes of the imaging apparatus, an edge of the high-exposure image can be avoided from being combined in the low-luminance region. That is, the reference intensity creation unit 203 applies the processing for extending the high-lightness region and reducing the low-lightness region so as to set a high adding coefficient of the low-exposure image in the low-luminance region, that is, to set a high intensity of the reference intensity image in that region.

That is, since an allowable amount (the number of pixels) of a deviation, which is generated between images used to create an HDR image due to image blurs or shake of the imaging apparatus, is set in advance, the processing executed by the reference intensity creation unit 203 can have a predetermined calculation volume each time. In the aforementioned example, a deviation between the images is allowable up to four pixels. For example, when a deviation up to six pixels is allowed, the following processes can be executed.

1. The conversion processing of the MAX filter circuit 303 is applied to an image having the number of pixels which is 1/16 of the image input to the reference intensity creation unit 203.

2. The enlargement circuit 302 applies the enlargement processing for doubling the number of pixels respectively in the vertical and horizontal directions to the image after the conversion processing.

3. The MAX filter circuit 303 applies the conversion processing to the image after the enlargement processing.

4. The enlargement circuit 302 further applies the enlargement processing for doubling the number of pixels respectively in the vertical and horizontal directions to the image after the second conversion processing.

In this way, in the image output from the reference intensity creation unit 203, the high-lightness region can be extended by the arbitrary number of pixels, and the reference intensity image which can prevent multiple edges from being combined in a low-luminance region of an HDR image can be created.

Figure 6A:
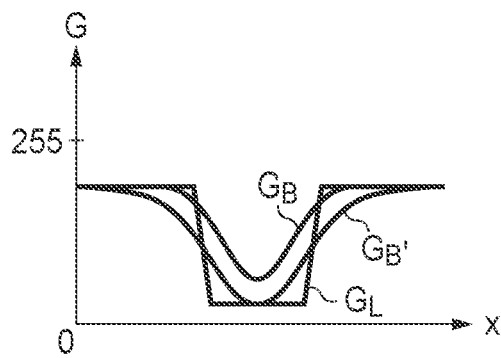
FIGS. 6A, 6B, 6C, and 6D are graphs for explaining processing in a signal processor according to the first embodiment of the present invention.
Figure 6B:
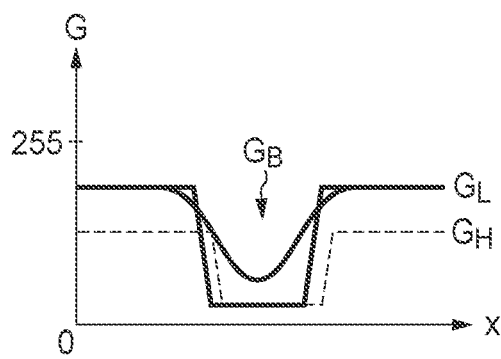
Figure 6C:
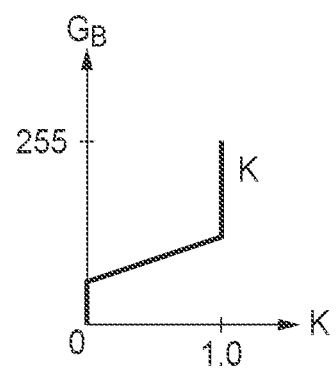
Figure 6D:
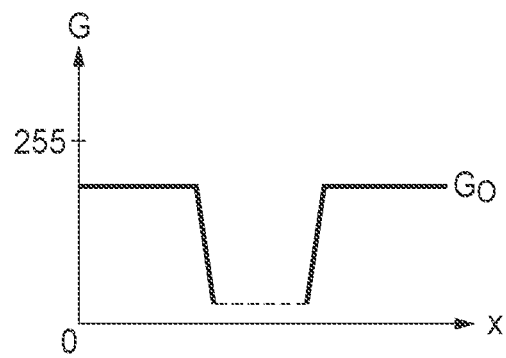

FIG. 6A shows an intensity $G_L$ of the low-exposure image after the gamma conversion, which image is input to the reference intensity creation unit 203, an intensity $G_B'$ of an image which has undergone only the reduction processing and enlargement processing, and an intensity $G_B$ of an image obtained by the conversion processing in the MAX filter 303. In such case, as shown in FIGS. 6B and 6C, for the reference intensity image $G_B$ obtained after the conversion processing in the MAX filter circuit 303, the adding coefficient K is 1.0 even at a boundary (edge) between the low- and high-luminance regions in the high-exposure image. That is, an edge of the high-exposure image can be avoided from being combined, and an HDR image having an intensity $G_O$ shown in FIG. 6D can be created.

In the description of this embodiment, the allowable amount of a deviation, which is generated between images required to create an HDR image due to image blurs or shakes of the imaging apparatus, is set in advance. However, the present invention is not limited to this. For example, a gyro sensor may detect shaking of the imaging apparatus to control the reference intensity creation unit 203 to execute different processes according to the shake amount, or a deviation between images to be combined may be detected to control the reference intensity creation unit 203 to execute different processes. When the gyro sensor is used, for example, the relationship between rotation information of the imaging apparatus, which is output from the gyro sensor, and the number of pixels indicating the deviation amount of a subject between images to be combined may be measured in advance at the time of manufacture, and the measurement result may be applied upon capturing images. For example, by the measurements at the time of manufacture, a deviation amount of a subject is decided to be 5 pixels when a rotation angle in a pitch direction falls within a range from 0° to 1°, it is decided to be 10 pixels when the rotation angle falls within a range from 1° to 2°, it is decided to be 20 pixels when the rotation angle is 3° or more, and so forth. When the number of pixels indicating the deviation amount between images is detected from images to be combined, two images may be searched for an identical subject image using, for example, a given technique such as pattern matching, and a motion vector of that subject may be calculated, thus detecting the number of pixels indicating the deviation amount. When the number of pixels indicating the deviation amount of a subject between images to be combined can be detected, the reference intensity creation unit 203 may be controlled to set a difference deviation allowable amount according to the number of pixels. For example, a value twice the detected number of pixels indicating the deviation amount of a subject is set as a deviation allowable amount in consideration of detection errors.

In this embodiment, the conversion processing to be applied in the MAX filter circuit 303 has been described as the processing for conducting a search within a range of 3×3 surrounding pixels having a target pixel as the center. However, the present invention is not limited to this. That is, the setting method of a pixel range to be searched with respect to the target pixel is not particularly limited. For example, a search may be conducted for 5×5 surrounding pixels although the processing volume increases. When a search is conducted for 5×5 surrounding pixels, a reduction ratio of the reduction processing to be executed in the reduction circuit 301 may be decreased. That is, the range to be searched having a target pixel as the center in the MAX filter circuit 303 may be set to have the number of pixels obtained by multiplying the deviation allowable amount of a subject between images required to create an HDR image or the detected deviation amount by the reduction ratio of the reduction processing executed in the reduction circuit 301.

As described above, even when image blurs or shakes of the imaging apparatus have been generated, the image processing apparatus of this embodiment provides a naturally combined image, a dynamic range of which is extended. More specifically, the image processing apparatus obtains a first image captured using a first exposure, and a second image captured using a second exposure higher than the first exposure. Then, the apparatus reduces the first image which has undergone gamma conversion processing, and converts, for respective pixels of the reduced image, a pixel value of a pixel of interest to a maximum pixel value of those of pixels within a range of the pre-set number of pixels having the pixel of interest as the center. Furthermore, the apparatus enlarges an image obtained by converting the pixel values up to the number of pixels of the first image which has undergone the gamma conversion processing, thereby creating a third image to be used as a reference for combining processing. Using adding coefficients, which are associated in advance with pixel values of the third image created in this way, the first and second images are weighted-combined, thus creating an image having extended dynamic range.

With the above processing, even when image blurs or shakes of the imaging apparatus have been generated during capturing of images which have different exposures and are used to create an HDR image, an edge generated due to a luminance gradient of a high-exposure image can be avoided from being combined in a low-luminance region. That is, the image processing apparatus of this embodiment can create an HDR image free from any multiple edges.

In the above description, an HDR image is created by combining two images having different exposures. Also, the present invention may be applied to a case in which an HDR image is created by combining three or more images having different exposures. For example, a case will be described below wherein three images $G_1$, $G_2$, and $G_3$ having different exposures (which meet $G_1 < G_2 < G_3$) are combined to create an HDR image using weighted-adding coefficients $K_1$, $K_2$, and $K_3$ shown in FIG. 10.

In FIG. 10, the ordinate plots a weighted-adding coefficient, and the abscissa plots a reference intensity created from the lowest-exposure image $G_1$. That is, all the weighted-adding coefficients are decided with reference to the reference intensity created from the lowest-exposure image $G_1$.

Initially, an intermediate HDR image $G_{12}$ is created by HDR-combining the images $G_1$ and $G_2$. That is from equation (1), $G_{12} = K_1 \times G_1 + K_2 \times G_2$.

Next, a final HDR image $G_O$ is created by HDR-combining the images $G_{12}$ and $G_3$. That is, from equation (1), $G_O = 1 \times$ $G_{12}+K_3 \times G_3$. The same reference intensity image as that used to create the intermediate HDR image $G_{12}$ is used.

According to this embodiment, even when three or more images having different exposures are combined to create an HDR image, since the lowest-exposure image is used as the reference intensity, weighted-adding coefficients for all lightness levels from a low exposure to a high exposure can be calculated from one reference intensity image.

Second Embodiment

Figure 4A:
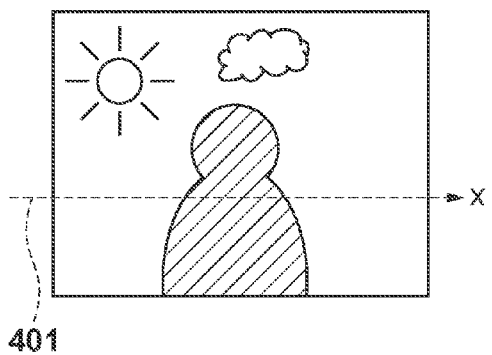
FIGS. 4A and 4B are views showing scene examples upon creation of an HDR image according to the embodiment of the present invention.

The aforementioned first embodiment has exemplified the case in which a high-luminance background region includes a low-luminance region of a person as a main subject, as shown in FIG. 4A. This embodiment will explain HDR image creation processing when a low-luminance region includes a small high-luminance region formed by, for example, sunshine streaming through leaves or spot light, as shown in FIG. 4B.

Figure 4B:
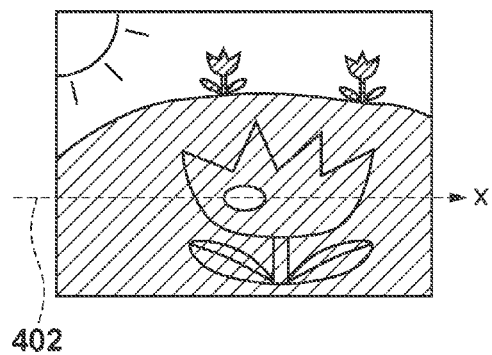
Figure 5B:
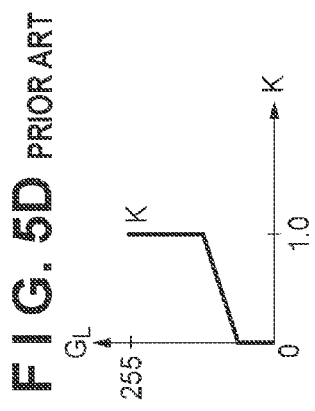
FIGS. 5A, 5B, 5C, 5D, 5E, and 5F are graphs for explaining problems at the time of creation of an HDR image in the related art.
Figure 5C:
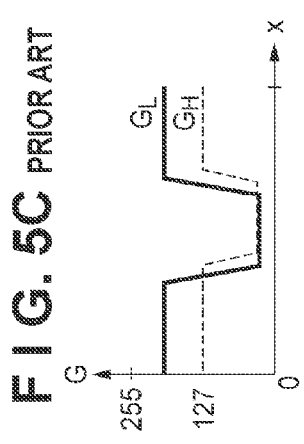
Figure 5A:
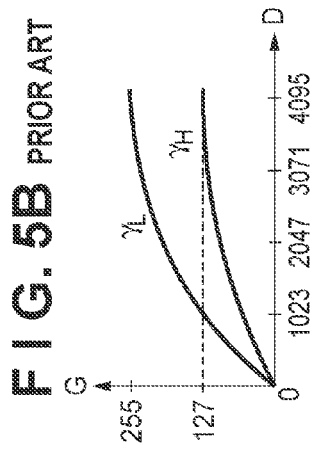
Figure 5E:
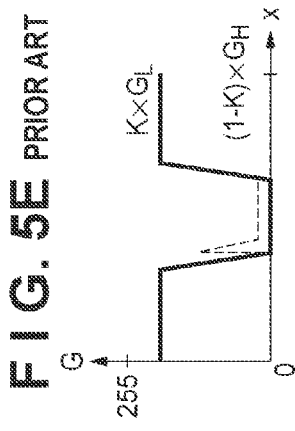
Figure 5F:
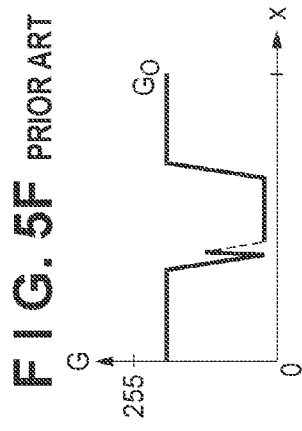
Figure 5D:
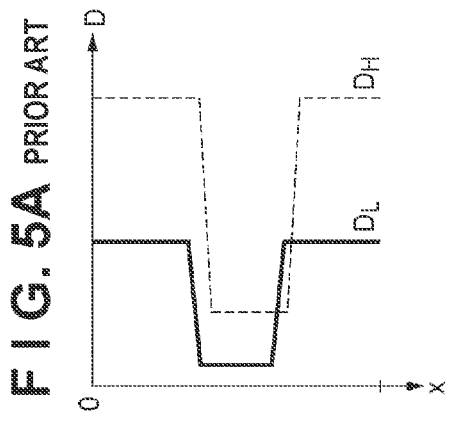

In case of the scene shown in FIG. 4B, the small high-luminance region is extended by applying conversion processing in the MAX filter circuit 303 as in the aforementioned embodiment. However, even in such small high-luminance region, when an adding coefficient of a low-exposure image is set to be high, a small region surrounded by a shadow-saturated image is generated, thus giving an impression of an unnatural image to the user. For this reason, this embodiment will explain processing executed when a size of a small high-luminance region, which is determined to skip intensity correction of an image having a reference exposure, is set in advance.

For example, when the size of a small high-luminance region, which is determined to skip intensity correction, is set in advance to be 16 pixels, and when an allowable amount of a deviation generated between images required to create an HDR image is four pixels, the reference intensity creation unit 203 creates a reference intensity image as follows.

1. The reduction circuit 301 executes reduction processing for reducing the number of pixels of an image input to the reference intensity creation unit 203 to $\frac{1}{16}$ respectively in the vertical and horizontal directions.

2. The enlargement circuit 302 applies enlargement processing for enlarging the image after the reduction processing to an image having the number of pixels four times of that image respectively in the vertical and horizontal directions.

3. The MAX filter circuit 303 applies conversion processing to the image after the enlargement processing.

4. The enlargement circuit 302 further applies enlargement processing for enlarging the image after the conversion processing to an image having the number of pixels four times of that image respectively in the vertical and horizontal directions.

That is, since the reduction circuit 301 executes the reduction processing to the number of pixels, which allows to determine that there is no small high-luminance region or that a luminance gradient of that region is not steep, intensity correction for that region can be skipped. Furthermore, the enlargement processing is applied to an image input to the reference intensity creation unit 203 to increase the number of pixels to four times respectively in the vertical and horizontal directions. Then, the conversion processing in the MAX filter circuit 303 is executed, thereby creating a reference intensity image which can allow a deviation between images up to four pixels.

Figure 7A:
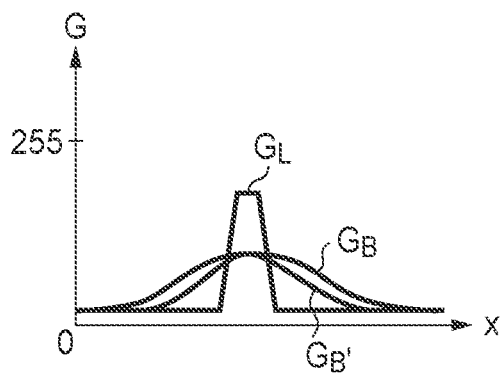
FIGS. 7A, 7B, 7C, and 7D are graphs for explaining processing in a signal processor according to the second embodiment of the present invention.
Figure 7B:
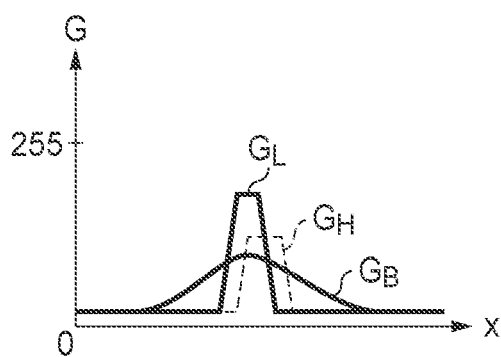
Figure 7C:
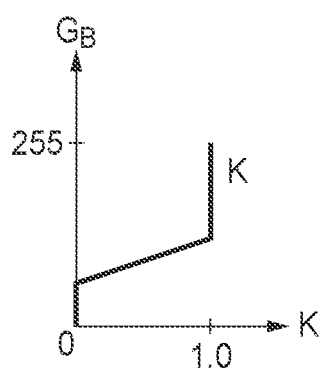
Figure 7D:
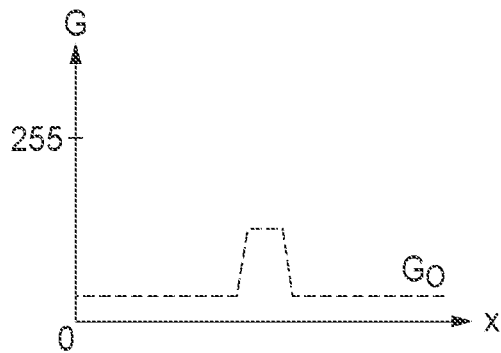

FIG. 7A shows an intensity $G_L$ of a low-exposure image after the gamma conversion, which is input to the reference intensity creation unit 203, an intensity $G_B'$ of an image obtained after only the reduction processing and enlargement processing, and an intensity $G_B$ of an image obtained by the conversion processing in the MAX filter circuit 303 on a horizontal line 402 of the image shown in FIG. 4B. As can be seen from FIG. 7A, an image is converted by the reduction processing to a size which allows to determine that a luminance gradient of a small high-luminance region is not steep. In such case, in the reference intensity image $G_B$ obtained by executing the conversion processing in the MAX filter circuit 303, an adding coefficient K is less than 1.0 in a high-luminance region, as shown in FIGS. 7B and 7C. That is, a shadow-saturated portion of a low-exposure image can be prevented from being combined to a portion around a small high-luminance region, and an HDR image having an intensity $G_O$ shown in FIG. 7D can be created.

In this manner, even when a small high-luminance region is included, the method determines that intensity correction of an image having a reference exposure is skipped, and, an HDR image which does not give any unnatural impression to the user can be created.

Third Embodiment

The aforementioned first and second embodiments have explained the method of deciding adding coefficients of respective images used to create an HDR image by converting an intensity of a gamma-converted low-exposure image. This embodiment will explain an adding coefficient method of deciding adding coefficient images having different spatial frequency characteristics by reducing adding coefficient images which represent adding coefficients of respective pixels of low- and high-exposure images at different reduction ratios. Note that this embodiment it is assumed that an HDR image is created in a scene shown in FIG. 4A as in the first embodiment.

FIG. 8 is a circuit diagram showing processing executed inside the reference intensity creation unit 203 according to this embodiment. The reference intensity creation unit 203 includes a reduction circuit 801, enlargement circuit 802, MIN filter circuit 803, and combining coefficient decision circuit 804 in addition to the reduction circuit 301 which executes reduction processing of an image, enlargement circuit 302, and MAX filter circuit 303. The reduction circuit 801 and enlargement circuit 802 are the same as the reduction circuit 301 and enlargement circuit 302.

The combining coefficient decision circuit 804 converts pixel values of gamma conversion outputs into adding coefficient images $G_{K0}$ and $G_{KK0}$ of low- and high-exposure images. For example, when a gamma conversion output $G_L$ of an input low-exposure image is as shown in FIG. 9A, the adding coefficient images $G_{K0}$ and $G_{KK0}$ shown in FIGS. 9C and 9D are created using conversion characteristics shown in FIG. 9B.

The MIN filter circuit 803 is a conversion filter, which searches 3×3 surrounding pixels of each pixel of an input image to have that pixel as the center, and substitutes a minimum pixel value of the surrounding pixels as a new pixel value of that pixel, contrary to the MAX filter circuit 303. That is, in an image output from the MIN filter circuit 802, a region with small pixel values, that is, a high-lightness region is simply extended by one pixel in upper, lower, right, and left directions and, conversely, a low-lightness region is reduced by one pixel in upper, lower, right, and left directions, compared to the input image.

The adding coefficient image $G_{K0}$ undergoes reduction, MAX filter, and enlargement processes by the same method as that described in FIG. 3 of the first and second embodiments, thus creating an adding coefficient image $G_K$. An image size to which the MAX filter is applied is decided by the same method as in the first and second embodiments. For example, when a size of a small low-luminance region, which allows to determine that intensity correction is skipped in a low-exposure image, is 8 pixels, a reduction ratio of the adding coefficient image $G_{K0}$ is ⅛.

Also, the adding coefficient image $G_{KK0}$ undergoes reduction, MIN filter, and enlargement processes by the same method, thus creating an adding coefficient image $G_{KK}$. For example, when a size of a small high-luminance region, which allows to determine that intensity correction is skipped in a high-exposure image, is 16 pixels, a reduction ratio of the adding coefficient image $G_{KK0}$ is ¹⁄₁₆.

The created adding coefficient images $G_K$ and $G_{KK}$ are output to a combining coefficient decision circuit 204 as reference intensity images of the low- and high-exposure images, and are converted into adding coefficients K and KK using conversion characteristics shown in FIGS. 9E and 9F. The low-exposure image $G_L$ and high-exposure image $G_H$ are multiplied by these adding coefficients K and KK as K and KK in equation (1) in a combining unit 205, thus creating an HDR image $G_O$ as an addition result.

The adding coefficient image $G_K$ includes a broad large-pixel value region since it is created by the MAX filter processing, and pixel values assume large values even at a boundary (edge) between low- and high-luminance regions in the high-exposure image. For this reason, the corresponding adding coefficient K assumes 1.0 in that region.

On the other hand, the adding coefficient image $G_{KK}$ includes a broad small-pixel value region since it is created by the MIN filter processing, and pixel values assume small values even at a boundary (edge) between low- and high-luminance regions in the high-exposure image. For this reason, the corresponding adding coefficient KK assumes 0.0 in that region.

That is, an edge of a high-exposure image can be avoided from being combined, and an HDR image having an intensity $G_O$ shown in FIG. 9G can be created. That is, in the adding coefficient image $G_K$, a high-lightness region is extended by the conversion processing in the MAX filter circuit 303 as in the first embodiment. In the adding coefficient image $G_{KK}$, a high-lightness region is extended by the conversion processing in the MIN filter circuit 803. Hence, regions to be formed by weighted combination of the low- and high-exposure images correspond to a low-luminance person region. For this reason, even when a deviation is generated between images required to create an HDR image due to image blurs and shakes of the imaging apparatus, an edge of the high-exposure image can be avoided from being combined in a low-luminance region.

As described above, by changing the spatial frequency characteristics of the adding coefficient images for the low- and high-exposure images, even when an image includes both a small low-luminance region and small high-luminance region, whether or not to correct an intensity can be independently controlled in the low- and high-exposure images.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-024435, filed Feb. 7, 2011, which is hereby incorporated by reference herein in its entirety.

What is claimed is:

1. An image processing apparatus comprising a hardware processor used for implementing each of the following units:
    an obtaining unit configured to obtain a first image captured using a first exposure and a second image captured using a second exposure, wherein the second exposure is higher than the first exposure;
    a creating unit configured to create, from the first image, a third image in which regions having high lightness of the first image are extended; and
    a combining unit configured to perform weighted combination of respective pixels of the first image and the second image using adding coefficients which are based on the third image, wherein the adding coefficients are predetermined such that the weight of the second image is larger as a lightness of a corresponding pixel on the third image is smaller,
    wherein the creating unit creates, from the first image, the third image by performing reduction processing for the first image, converting the pixel value of each pixel of the first image performed the reduction processing to a pixel value having maximum lightness within a pre-set range centered around the pixel, and enlarging the converted first image, and
    the pre-set range includes a range decided based on a value obtained by multiplying the number of pixels that allows a deviation of a subject, which is generated between the first image and the second image obtained by the obtaining unit, by a reduction ratio used to reduce the first image.

2. The apparatus according to claim 1, wherein the creating unit applies low-pass filter processing to the first image before performing the reduction processing for the first image.

3. The apparatus according to claim 1, further comprising a detecting unit configured to detect a number of pixels indicating a deviation amount of a subject between the first image and the second image obtained by the obtaining unit,
    wherein the creating unit determines the pre-set range according to the number of pixels indicating the deviation amount of the subject, which is detected by the detecting unit.

4. The apparatus according to claim 3, wherein the pre-set range includes a range decided based on a value obtained by multiplying the number of pixels indicating the deviation amount of the subject by a reduction ratio used to reduce the first image.

5. A control method of an image processing apparatus, comprising:
    an obtaining step of obtaining a first image captured using a first exposure and a second image captured using a second exposure, wherein the second exposure is higher than the first exposure;

a creating step of creating, from the first image, a third image in which regions having high lightness of the first image are extended; and
a combining step of performing weighted combination of respective pixels of the first image and the second image using adding coefficients which are based on the third image, wherein the adding coefficients are predetermined such that the weight of the second image is larger as a lightness of a corresponding pixel on the third image is smaller,
wherein in the creating step, the third image is created from the first image by performing reduction processing for the first image, converting the pixel value of each pixel of the first image performed the reduction processing to a pixel value having maximum lightness within a pre-set range centered around the pixel, and enlarging the converted first image, and
the pre-set range includes a range decided based on a value obtained by multiplying the number of pixels that allows a deviation of a subject, which is generated between the first image and the second image obtained in the obtaining step, by a reduction ratio used to reduce the first image.

6. A non-transitory recording medium recording a program for controlling a computer to function as respective unit of an image processing apparatus, the image processing apparatus comprising a hardware processor for implementing each of the following units:

an obtaining unit configured to obtain a first image captured using a first exposure and a second image captured using a second exposure, wherein the second exposure is higher than the first exposure;
a creating unit configured to create, from the first image, a third image in which regions having high lightness of the first image are extended; and
a combining unit configured to perform weighted combination of respective pixels of the first image and the second image using adding coefficients which are based on the third image, wherein the adding coefficients are predetermined such that the weight of the second image is larger as a lightness of a corresponding pixel on the third image is smaller,
wherein the creating unit creates, from the first image, the third image by performing reduction processing for the first image, converting the pixel value of each pixel of the first image performed the reduction processing to a pixel value having maximum lightness within a pre-set range centered around the pixel, and enlarging the converted first image, and
the pre-set range includes a range decided based on a value obtained by multiplying the number of pixels that allows a deviation of a subject, which is generated between the first image and the second image obtained in the obtaining step, by a reduction ratio used to reduce the first image.

* * * * *